(12) United States Patent
Lowry et al.

(10) Patent No.: US 12,743,112 B2
(45) **Date of Patent: *Sep. 22, 2026**

(54) MULTI-STAGE WATER EFFECT SYSTEM

(71) Applicant: Universal City Studios LLC, Universal City, CA (US)

(72) Inventors: Sean Michael Lowry, Orlando, FL (US); Gregory Shellman Hall, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,682

(22) Filed: Nov. 27, 2023

(65) Prior Publication Data

US 2024/0094748 A1 Mar. 21, 2024

Related U.S. Application Data

(63) Continuation of application No. 17/243,233, filed on Apr. 28, 2021, now Pat. No. 11,835,975.

(60) Provisional application No. 63/017,439, filed on Apr. 29, 2020.

(51) Int. Cl.

| | |
|---|---|
| ***G05D 7/06*** | (2006.01) |
| ***A63G 3/02*** | (2006.01) |
| ***A63G 31/00*** | (2006.01) |

(52) U.S. Cl.

CPC ............ *G05D 7/0682* (2013.01); *A63G 3/02* (2013.01); *A63G 31/007* (2013.01)

(58) Field of Classification Search

CPC ........ A63G 31/00; A63G 31/007; A63G 3/02; A63G 21/18; A63G 3/00; G05D 7/0682

USPC ........................................ 472/117, 128–129

See application file for complete search history.

(56) References Cited

U.S. PATENT DOCUMENTS

| | | | | |
|---|---|---|---|---|
| 1,885,643 A | 11/1932 | Thoerig et al. | | |
| 5,219,315 A | 6/1993 | Fuller et al. | | |
| 6,261,186 B1 * | 7/2001 | Henry | ................. | A63G 31/007 239/16 |
| 11,835,975 B2 * | 12/2023 | Lowry | .................... | A63G 3/02 |

(Continued)

FOREIGN PATENT DOCUMENTS

| | | |
|---|---|---|
| CN | 107206283 A | 9/2017 |
| CN | 109131764 A | 1/2019 |

(Continued)

OTHER PUBLICATIONS

PCT/US2021/029875 Invitation to Pay Additional Fees mailed Aug. 13, 2021.

(Continued)

*Primary Examiner* — Michael D Dennis

(74) *Attorney, Agent, or Firm* — Fletcher Yoder, P.C.

(57) ABSTRACT

A multi-stage water effect system includes a plurality of water ride vehicles. A water ride vehicle of the plurality of water ride vehicles has one or more water effect devices. The multi-stage water effect system also includes a control system communicatively coupled to the one or more water effect devices of the plurality of water ride vehicles. The control system activates the one or more water effect devices of the water ride vehicle to provide a first fluid flow at a first time. The control system also activates the one or more water effect devices of the water ride vehicle to provide a second fluid flow at a second time.

19 Claims, 6 Drawing Sheets

(56) References Cited

U.S. PATENT DOCUMENTS

| | | | | |
|---|---|---|---|---|
| 2003/0052007 | A1 | 3/2003 | Paul et al. | |
| 2003/0203760 | A1 | 10/2003 | Henry et al. | |
| 2006/0135271 | A1 | 6/2006 | Casey et al. | |
| 2015/0190726 | A1* | 7/2015 | Frolov | A63G 1/02 472/61 |
| 2015/0306507 | A1* | 10/2015 | Burger | A63G 3/00 472/128 |
| 2016/0136527 | A1* | 5/2016 | Hunter | A63G 7/00 472/88 |
| 2016/0136529 | A1* | 5/2016 | Weston | A63G 21/18 472/117 |
| 2019/0366223 | A1 | 12/2019 | Sall et al. | |

FOREIGN PATENT DOCUMENTS

| | | | |
|---|---|---|---|
| EP | 1604712 | A1 | 12/2005 |
| JP | S62137082 | A | 6/1987 |
| KR | 20160147908 | A | 12/2016 |
| KR | 102018062 | B1 | 10/2019 |
| WO | 2015000522 | A1 | 1/2015 |

OTHER PUBLICATIONS

KR Office Action for Korean Application No. 2022-7041825 mailed Sep. 3, 2025.

SG Office Action for Singapore Application No. 11202253898Q mailed May 16, 2025.

JP Office Action for Japanese Application No. 2022-565883 mailed Feb. 4, 2025.

CN Office Action for Chinese Application No. 202180031816.9 mailed May 29, 2026.

* cited by examiner

MULTI-STAGE WATER EFFECT SYSTEM

CROSS-REFERENCE TO RELATED APPLICATION

This application is a continuation of U.S. patent application Ser. No. 17/243,233, title "Multi-Stage Water Effect System," which was filed on Apr. 28, 2021, which claims priority to and the benefit of U.S. Provisional Patent Application Ser. No. 63/017,439, titled "Multi-Stage Water Effect System," which was filed on Apr. 29, 2020, each of which is herein incorporated by reference in its entirety for all purposes.

BACKGROUND

The present disclosure relates generally to amusement park attractions and, specifically, to methods and equipment utilized to provide special effects in a water ride of an amusement park.

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Water parks seek to provide a variety of ride experiences for park visitors, including water rides with water ride vehicles (e.g., bumper rides, log rides, and raft rides). Certain types of water rides provide appeal to riders by adding thrilling aspects to the rider's experience within the water ride such as sharp turns, collisions with the course and/or other water ride vehicles that may result in the rider being splashed. However, the thrilling aspects may not vary between ride experiences, which means that repeat visitors are less surprised on subsequent visits. In addition, the experience for each rider is the same, regardless of their actions or the course of the ride. It is presently recognized that certain water ride vehicles may provide additional appeal to riders by incorporating the thrilling aspects that are more specific to ride experience and/or each water ride vehicle.

BRIEF DESCRIPTION OF THE DRAWINGS

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a multi-stage water effect system includes a plurality of water ride vehicles. A water ride vehicle of the plurality of water ride vehicles has one or more water effect devices. The multi-stage water effect system also includes a control system communicatively coupled to the one or more water effect devices of the plurality of water ride vehicles. The control system activates the one or more water effect devices of the water ride vehicle to provide a first fluid flow at a first time. The control system also activates the one or more water effect devices of the water ride vehicle to provide a second fluid flow at a second time.

In one embodiment, a water ride vehicle of a water ride of an amusement park includes a plurality of sensors that obtain feedback associated with an interaction between the water ride vehicle and the water ride. The water ride vehicle also includes a plurality of water effect devices that provide a fluid flow. Additionally, the water ride vehicle includes a control system communicatively coupled to the plurality of sensors and the plurality of water effect devices. The control system receives the feedback indicative of the interaction of the water ride vehicle and the water ride from at least one sensor of the plurality of sensors. The control system also selects a stage of operation from a plurality of stages of operation based on the feedback. The plurality of stages of operation have a first stage of operation associated with a first flow rate of fluid from a first subset of the plurality of water effect devices and a second stage of operation associated with a second flow rate of the fluid from a second subset of the plurality of water effect devices. Additionally, the control system activates the first subset of the plurality of water effect devices to provide the fluid at the first flow rate in response to selection of the first stage of operation. Further, the control system activates the second subset of the plurality of water effect devices to provide the fluid at the second flow rate in response to selection of the second stage of operation.

In one embodiment, a multi-stage water effect system includes a first water ride vehicle having a first plurality of water effect devices. The multi-stage water effect system also includes a second water ride vehicle having a second plurality of water effect devices. Additionally, the multi-stage water effect system includes a control system communicatively coupled to the first plurality of water effect devices and the second plurality of water effect devices. The control system receives a signal associated with changing a first stage of operation of the first water ride vehicle, a second stage of operation of the second water ride vehicle, or both. The control system also activates the first plurality of water effect devices to selectively provide a first fluid at the first flow rate or the second flow rate when the signal is associated with changing the first stage of operation of the first water ride vehicle. Additionally, the control system activates the second plurality of water effect devices to selectively provide a second fluid at the first flow rate or the second flow rate when the signal is associated with changing the second stage of operation of the second water ride vehicle.

BRIEF DESCRIPTION OF THE DRAWINGS

Figure 1:
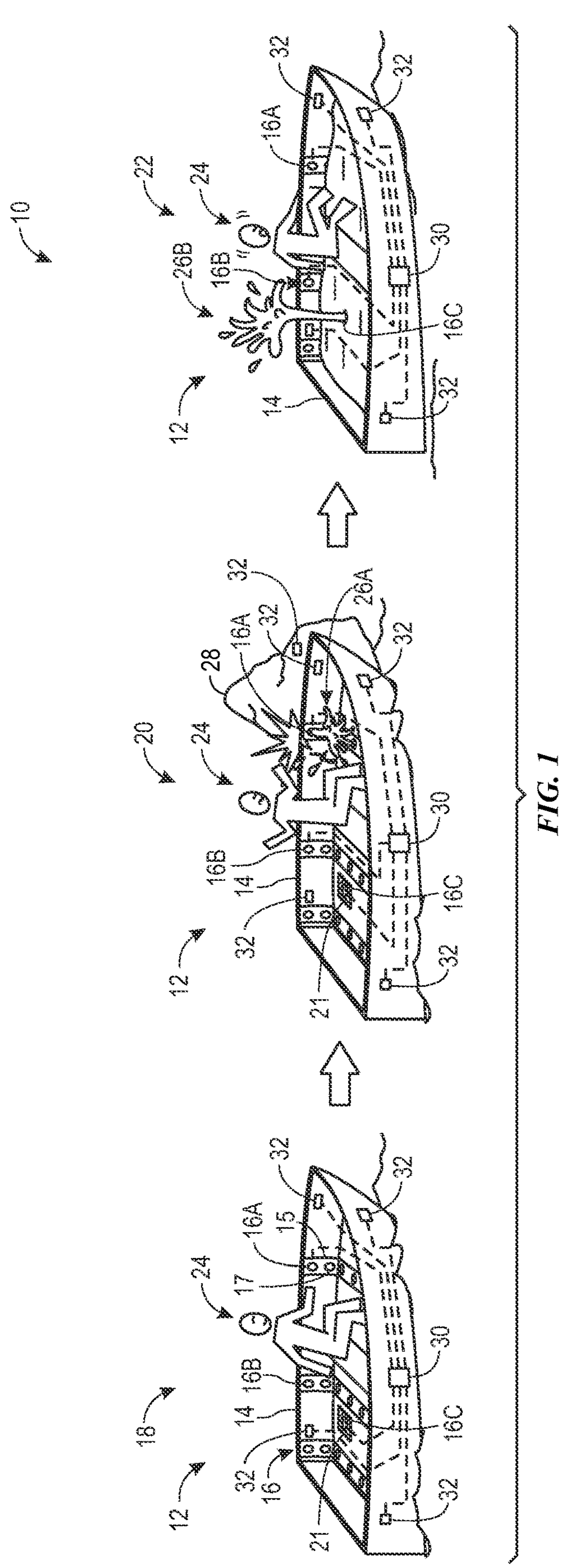
Figure 2:
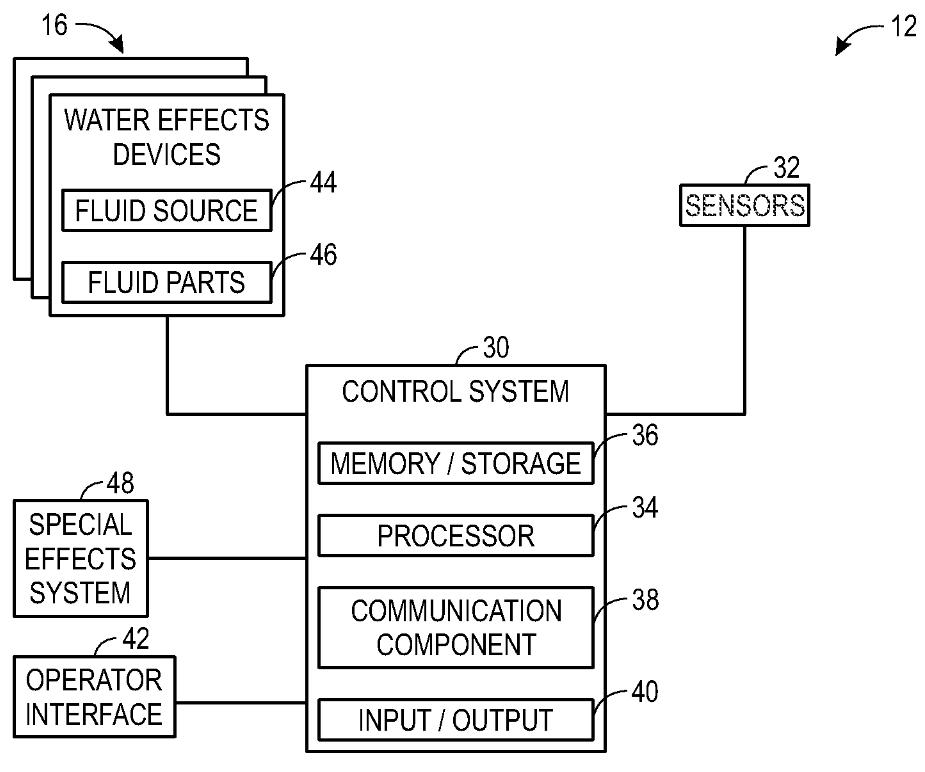
Figure 3:
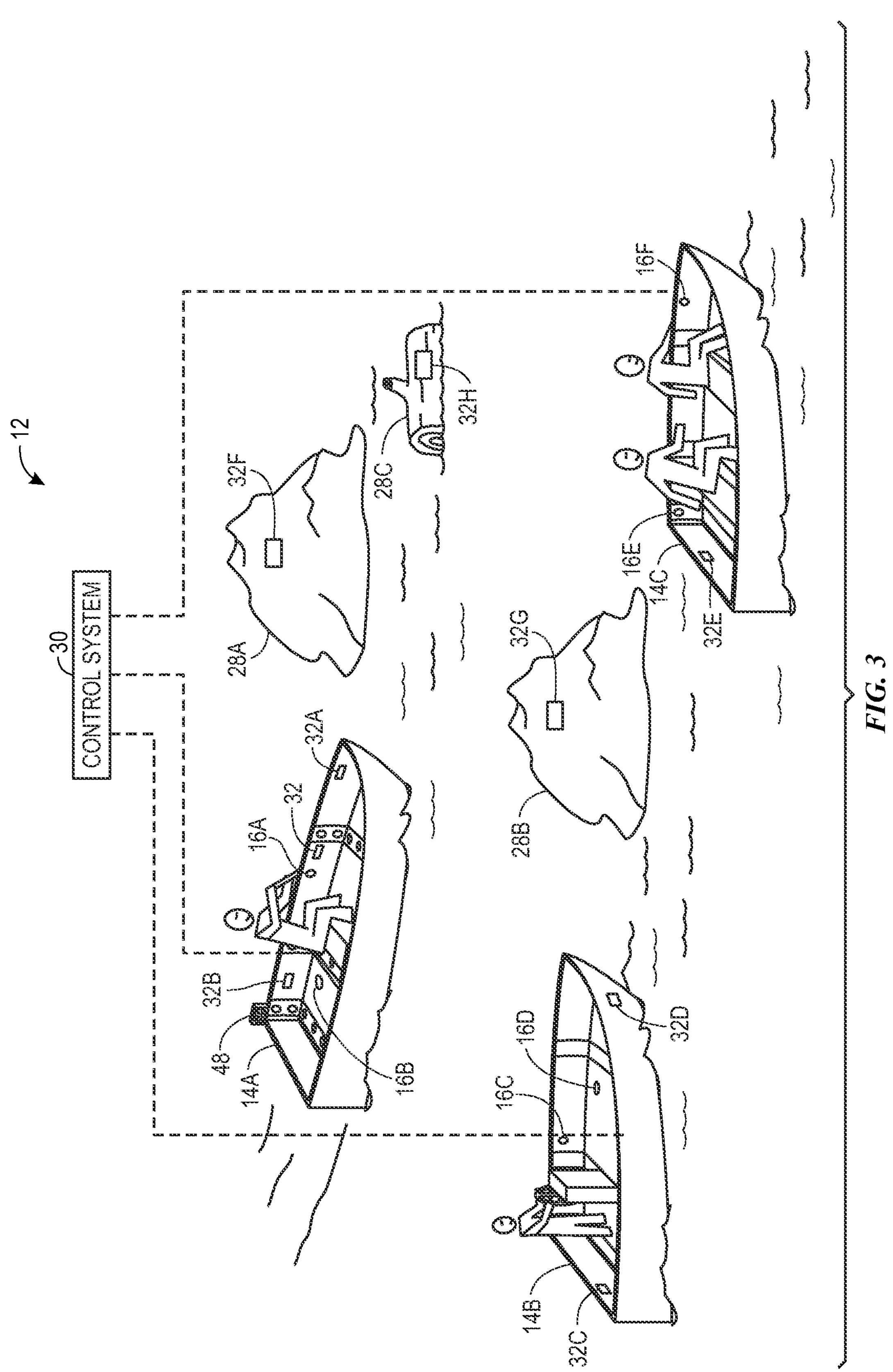
Figure 4:
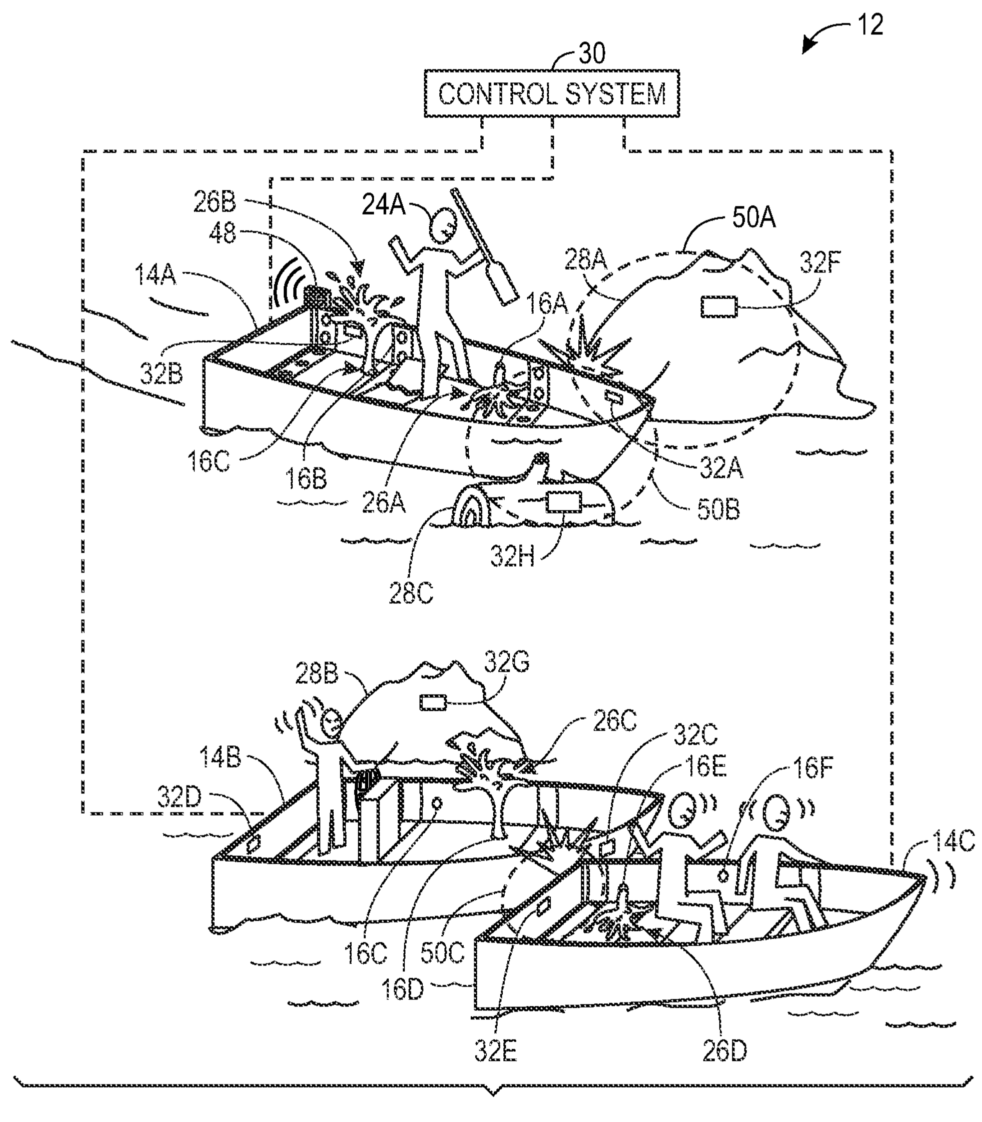
Figure 5:
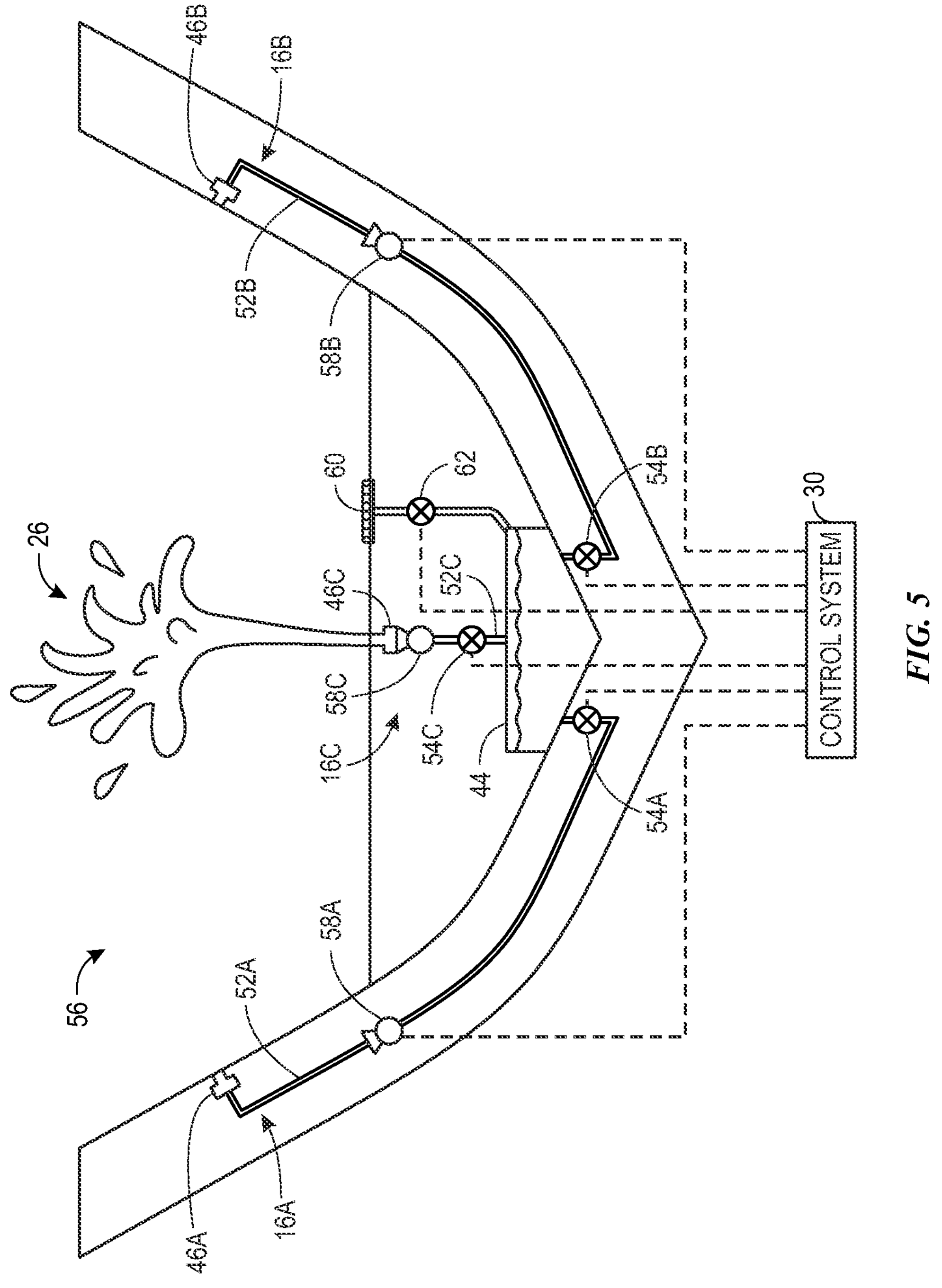
Figure 6:
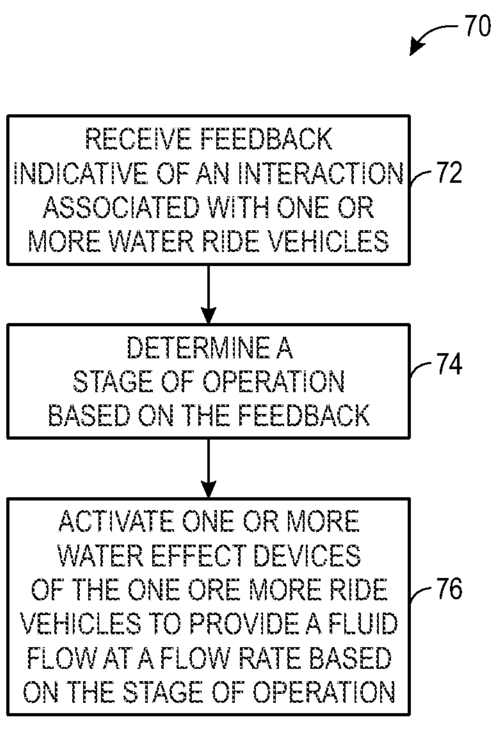

These and other features, aspects, and advantages of the present disclosure will become better understood when the following detailed description is read with reference to the accompanying drawings in which like characters represent like parts throughout the drawings, in which:

FIG. 1 is a perspective view of a multi-stage water effect system for use in conjunction with a water ride vehicle during different stages of operation of the multi-stage water effect system, in accordance with the present techniques;

FIG. 2 is a block diagram of a control system for controlling operation of the multi-stage water effect system, in accordance with the present techniques;

FIG. 3 is a perspective view of a water ride including a multi-stage water effect system for multiple water ride vehicles, in accordance with the present techniques;

FIG. 4 is a perspective view of the water ride including the multi-stage water effect system shown in FIG. 3 showing operation of one or more water effect devices of each water ride vehicle based on one or more water ride vehicle interactions during the water ride, in accordance with the present techniques;

FIG. 5 is a cross-section view of a water ride vehicle of the multi-stage water effect system, in accordance with the present techniques; and FIG. 6 is a flow diagram of a method of activating one or more water effect devices of the multi-stage water effect system, in accordance with the present techniques.

DETAILED DESCRIPTION

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates to a multi-stage water effect system that may be used in conjunction with amusement park rides, such as water rides. Certain types of water rides (e.g., log flume, water coasters, bumper boats, and the like) may be designed to provide a thrilling experience to one or more riders within the water ride vehicles of the water ride through collisions and/or rapid descents that result in water from outside of the water ride vehicle splashing the one or more riders within the water ride vehicle. To enhance the thrilling sensation felt by the one or more riders during the water ride, present embodiments use a multi-stage water effect system having one or more water effect devices disposed within and/or on the water ride vehicle.

The multi-stage water effect system provides a dynamic and variable thrill experience that triggers one or more aspects of a boat damage illusion in a layered manner. Over the course of a water ride, the multi-stage water effect system may cause a water ride vehicle to activate escalating effects (interior rivets popping, vehicle bottom partially filling with water, sound effects) associated with boat damage or a hull breach. These effects are part of an illusion and are tailored in size and scope to provide at thrill that is an enjoyable part of an immersive experience. Further, the multi-stage water effect system may be activated in a variable manner so that only certain ride vehicles experience these effects. The ride vehicles may be selected in a random manner, based on previous events (e.g., bumping or collisions) experienced during the water ride, based on rider information stored in a profile, and/or based on active selection or an opt-in selection by the rider or riders in an individual water ride vehicle. Further, the multi-stage water effect system may be activated to partially escalate, fully escalate, and/or de-escalate over the course of the water ride, providing additional ride variability for each water ride vehicle. In this manner, the illusion is more surprising and immersive and provides new thrills for repeat visitors who may not yet have experienced the multi-stage water effect system or all of the potential stages of a full escalation.

As referred to herein, an individual stage of operation of the multi-stage water effect system may include instructions for the multi-stage water effect system to activate a set of the one or more water effect devices of one or more ride vehicles to provide a fluid flow having a certain flow rate and/or certain flow pattern (e.g., a continuous flow rate, increasing flow rate, a quick burst of fluid flow, and the like). The instructions may also include instructions to activate any accompanying effects such as audio or motion effects that enhance each stage of the illusion. As discussed in more detail herein, a water ride vehicle interaction may refer to interactions between the water ride vehicle and features of the water ride (e.g., collisions with other water ride vehicles, barriers and the like) and/or the water ride vehicle passing certain checkpoints within the water ride (e.g., traveling a predetermined distanced, going through a rapid descent, and the like). In any case, the multi-stage water effect system provides one or more water effects via one or more water effect devices. In an embodiment, the water effect devices may at least partially fill a portion of the water ride vehicle. By providing a fluid flow into the water ride vehicle and partially filling a portion of the water ride vehicle with the fluid, the one or more riders can be made to feel as though the water ride vehicle is breaking and/or sinking, which may increase the thrill and excitement felt by the one or more riders, when, in actuality, the water ride vehicle remains afloat and secure.

Provided herein is a multi-stage water effect system including one or more water ride vehicles, each having one or more water effect devices that may enhance the experience of the respective riders. Additionally, the multi-stage water effect system may include a control system that activates or selects a stage of operation from multiple stages of operation. Based on the stage of operation, the control system may activate and/or adjust operation of the one or more water effect devices in accordance with the selected stage of operation. For example, the control system may increase a flow rate of a fluid flow provided by one or more water effect devices of a respective water ride vehicle based on individual water ride vehicle interactions associated with the respective water ride vehicle. As a result, the one or more riders of the one or more water ride vehicles may experience escalating water effects and/or the water ride vehicle may begin to fill with water, which may increase the excitement of the riders. Moreover, in an embodiment including multiple water ride, the control system may activate a different stage of operation for each water ride vehicle (i.e., trigger activation in a variable manner of the one or more water effect devices of each water ride vehicle) based on certain factors, such as the water ride vehicle interactions of the respective vehicles. Therefore, riders of different water ride vehicles experience different water effects over the course of the ride. Such varying water effects may not only enhance the immersive experiences during the ride, but may also provide a unique experience for repeat visitors.

FIG. 1 shows perspective views of a water ride 10 with a multi-stage water effect system 12 that includes a water ride vehicle 14 having one or more water effect devices 16. FIG. 1 shows different stages of operation of the multi-stage water effect system 12 including an initial stage 18, a first stage 20, and a second stage 22. As shown, the water ride vehicle 14 includes a rider 24. While only one rider 24 and one water ride vehicle 14 are shown, another embodiment of the multi-stage water effect system 12 may include any number (e.g., 1, 2, 3, 4, 5, or more) of water ride vehicles 14 with any number of riders 24. In the depicted embodiment, three stages of operation (e.g., the initial stage 18, the first stage 20, and the second stage 22) are shown. Additionally, while only three stages (e.g., the initial stage 18, the first stage 20, and the second stage 22) are shown, certain embodiment of the multi-stage water effect system 12 may include any number (2, 3, 4, 5, 6, or more) stages. Further, while the depicted embodiment shows an example of an escalating effect, an embodiment may also include de-escalation or only partial escalation over the course of the effect.

The multi-stage water effect system 12 activates the one or more water effect devices 16 in accordance with the appropriate stage of operation. In the depicted embodiment, in response to the multi-stage water effect system 12 operating in accordance with the initial stage 18, none of the water effect devices 16 are activated (e.g., providing a fluid flow). The initial stage 18 of operation of the multi-stage water effect system 12 may generally correspond to no activation of any of the water effect devices 16. For example, the initial stage 18 may correspond to a time period before any water ride vehicle interactions (e.g., collisions with barriers, other water ride vehicles, the water ride vehicle passing predetermined locations within the water ride 10) may occur and/or time events have elapsed, such as shortly after the rider 24 has entered the water ride vehicle 14 at the beginning of the water ride 10. As such, in one embodiment, the multi-stage water effect system 12 may operate in the initial stage 18 as a default.

The multi-stage water effect system 12 may enter the first stage 20 of operation and activate the one or more water effect devices 16 in accordance with the first stage 20 of operation. As provided herein, the first stage 20 of operation may be selected based on rider profile information, random selection, or the water vehicle ride interaction by way of example. In the depicted embodiment, the water ride vehicle interaction is the water ride vehicle 14 contacting (e.g., bumping, colliding, moving within a threshold range of) an attraction feature 28. As a result of the water ride vehicle interaction, the multi-stage water effect system 12 selects the first stage 20 of operation and activates the water effect device **16*a*, which causes the water effect device 16*a* to provide fluid flow 26*a* at a fluid flow rate and/or or fluid pressure according to instructions from a control system, as provided herein. However, in another embodiment, the multi-stage water effect system 12 may change the operation of the one or more water effect devices 16 after certain time events, such as a predetermined time duration after the start of a stage of operation, after the beginning of the water ride, and other thematic events that may incorporate a predetermined time duration. For example, the water effect device 16*a* may activate in accordance with the first stage 20 of operation after the a predetermined time duration (e.g., 10 seconds, 30 seconds, 1 minute, 2 minutes, 5 minutes, and the like) that begins with the start of the initial stage 18 of operation. In another embodiment, the water effect device 16*a* may activate in response to a measurable distance traveled by the water ride vehicle 14 (e.g., measured by sensors). For example, the attraction feature 28 may include sensor(s) that communicate with respective sensor(s) on the water ride vehicle 14 and provide feedback indicative of the measureable distance traveled by the water ride vehicle 14**.

After an additional water ride vehicle interaction (e.g., a subsequent interaction) has occurred that involves the water ride vehicle 14, the multi-stage water effect system 12 may select the second stage 22 of operation and thus activate the one or more water effect devices 16 in accordance with the second stage 22 of operation. For example, as a result of the second stage 22 of operation being selected, an additional water effect device **16*b*, 16*c* is activated to provide a fluid flow 26*b*. One or more characteristics of the fluid flow 26, such as the flow rate or pressure, from an individual water effect device 16 may be changed between different stages of operation or over the course of an individual stage of operation according to the control instructions associated with a particular stage of operation. In some embodiments, a flow rate or pressure of the fluid flow 26*b* may be relatively higher than a flow rate or pressure of the fluid flow 26*a* and/or provided from a different area of the water ride vehicle 14. The rider 24 may experience a thrill of excitement upon seeing the fluid flow 26*b* having a higher flow rate or pressure as well as the flow fluid 26*b* being provided from a different area of the water ride vehicle 14. In one embodiment, the additional water effect device 16*b* may be activated as a result of the water ride vehicle 14 contacting the attraction feature 28 (e.g., a subsequent interaction or collision), another attraction feature 28, another water ride vehicle 14 as part of an escalation. In an embodiment, transitioning from the first stage 20 to the second stage 22 of operation is a layered effect in which all water effect devices 16 active in the first stage 20 remain active in the second stage 22 while additional water effect devices 16 are also activated. In an embodiment, the activated subset and/or the flow rate of fluid flow 26 changes between stages of operation. In an embodiment, the operation of the multi-stage water effect system 12 may change from the first stage 20 of operation to the second stage 22 of operation after a time threshold occurring after the start of the first stage 20 of operation. It should be understood that each vehicle may include multiple water effect devices 16, and all or a subset of the water effect devices 16** may be activated during different stages.

In the illustrated embodiment, the water effect devices **16*a*, 16*b* may be integrated into features of the water ride vehicle 14 that are associated with springing leaks, such as prop hull rivets 17 incorporated into faux interior seams 15. The rivets 17 may be mechanically controlled to actuate forward in a popping motion as part of the first stage 20 of operation and in conjunction with activation of the fluid flow. In an embodiment, an individual water effect device 16*a* and its coupled individual rivet 17*a* may be actuated to pop in a coordinated manner following the activation of fluid flow from the individual water effect device 16*a*. For example, a spray of water from the individual water effect device 16*a* may be followed by popping of the rivet 17*a* and then a subsequent increased spray (caused by a relatively increased flow rate) from the individual water effect device 16*a*. Accordingly, an individual stage of operation may include instructions to operate certain effects in an ordered or coordinated manner as various substages such that the activated subset of water effect devices 16 and the fluid flow 26 from each water effect device 16 changes over the course of the stage of operation (e.g., increasing or decreasing fluid flow 26). In one example, in the first stage 20 of operation, the individual rivets 17 and their coupled water effect devices 16 may be controlled to activate in various locations all around the water ride vehicle at first in a staggered manner and subsequently with several individual rivets 17 and their coupled water effect devices 16 activating together to create the illusion of increasing water pressure on the hull or hull failure. The activated set or subset may be selected to spray around the entire interior to spread the water effect around to all of the riders. In an embodiment, the activated subset of water effect devices 16 may be selected to be located next to the seats of repeat riders 24 or thrill-seeking riders 24 (per rider profile information). The second stage 22 of operation may bring online a more dramatic influx of fluid into the water ride vehicle 14, such as through a water effect device 16***c* coupled to an opening or grate 21 in the bottom of the water ride vehicle 14.

While the depicted embodiment shows the second stage 22 occurring after the first stage 20 and the first stage 20 occurring after the initial stage 18, it should be noted that, in another embodiment, the relative order of the stages is non-limiting and may depend on the type of water ride vehicle interaction that triggered the stage. That is, in one embodiment, the multi-stage water effect system 12 may select the second stage 22 of operation and activate the one or more water effect devices 16 in accordance with the second stage 22 of operation although the a current stage of operation of the multi-stage water effect system 12 is the initial stage 18 of operation. For example, certain water ride vehicle interactions may cause the multi-stage water effect system 12 to change operation of the one or more water effect devices 16 from the initial stage 18 of operation directly to the second stage 22 of operation, such as a location of the water ride vehicle 14 that collided with another attraction feature 28, and/or input from an operator of the water ride 10. As another non-limiting example, the multi-stage water effect system 12 may change operation of the one or more water effect devices 16 from the initial stage 18 to the first stage 20 or the second stage 22 (bypassing the first stage) based on a magnitude of the water ride vehicle interaction. That is, continuing with the example of the water ride vehicle interaction being a collision, when a force of impact associated with the collision (e.g., measured by a sensor on the water ride vehicle 14) is above a threshold (e.g., an impact threshold), the multi-stage water effect system 12 may select the second stage 22 of operation. When the force of the impact associated with the collision is below the threshold, the multi-stage water effect system 12 may select the first stage 20 of operation.

The operation of the one or more water effect devices 16 may be controlled by a control system 30. While in the depicted embodiment the control system 30 is shown disposed on the water ride vehicle 14, in another embodiment, the control system 30 may be separate from the water ride vehicle 14 and communicate remotely with the one or more water effect devices 16. For example, in an embodiment where the multi-stage water effect system 12 includes multiple water ride vehicles 14, one or more remote control systems 30 may control operation of each water ride vehicles. Alternatively, the control system 30 may include a master controller as well as slave controllers for each of the water ride vehicles 14. In one embodiment, the one or more water effect devices 16 may be activated based on signals from one or more sensors 32 that receive feedback indicative of a condition associated with the water ride vehicle 14, which may be used by the control system 30 to determine whether a water ride vehicle interaction has occurred. In response to determining whether the water ride vehicle interaction has occurred and determining the type of water ride vehicle interaction, the control system 30 may select (e.g., change) a stage of the operation (e.g., the first stage 20 or the second stage 22) and activate the one or more water effect devices 16 in accordance with the selected stage of operation.

Accordingly, the multi-stage water effect system 12 may operate under the control system 30, as shown in the block diagram of FIG. 2. The control system 30 may include a processor 34, which may include one or more processing devices, and a memory 36 storing instructions executable by the processor 34. The memory 36 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 34 or by any general purpose or special purpose computer or other machine with a processor. For example, the memory 36 may store a look-up table that may reference certain water ride vehicle interactions and corresponding stages of operations, which may be used by the processor 34 for selecting a stage of operation.

The control system 30 may also include communications circuitry 38 and/or input and output circuitry 40 to facilitate communication with other components of the multi-stage water effect system 12. In addition, the control system 30 may be coupled, either directly or wirelessly, to an operator input device or operator interface 42 that, in operation, may be used by a ride technician to provide input used to control one or more ride features. As noted, the operator interface 42, or other components of the multi-stage water effect system 12, may be located remotely from the control system 30 in certain embodiments and may be, for example, implemented on a mobile device.

As discussed above, control system 30 may control operation of the water effect devices 16, such as activation of the water effect devices to provide a fluid flow, the flow rate and/or type of flow of the fluid flow, and a number of water effect devices 16 to operate based on a stage of operation selected by the control system 30. The water effect devices 16 may include one or more fluid sources 44 in fluid communication with one or more fluid outlet ports 46 (e.g., via a channel, conduit, and the like). Upon receiving a signal from the control system 30, the one or more water effect devices 16 may open the flow of fluid to the water ride vehicle 14, such as by opening a valve to release the fluid (e.g., provide a fluid flow) and/or activating one or more pumps to affect the flow rate and/or flow pressure of the fluid flow. Accordingly, the water effect devices 16 may include suitable flow control elements, such as valves and pumps configured to be operated under control of the control system 30. In addition, the control system 30 may also control deactivation of fluid flow and/or fluid draining. In one embodiment, the fluid flow is automatically shut down and/or drained if the fill level rises above a predetermined level, which may be determined by one or more of an operator input or a sensor feedback.

In certain embodiments, the multi-stage water effect system 12 may also include one or more special effects systems

48 under control of the control system 30. Such special effects may include light effects, motion effects, sound effects, image effects etc. A special effects system 48 may be configured to coordinate with the fluid effects as provided herein. For example, sound effects of rushing water may be triggered concurrently with the fluid flow to create the overall impression of a deluge of water filling the water ride vehicle 14. As another non-limiting example, motion effects controlled by actuators may be triggered before fluid flow to create the illusion to a rider that structural support features of the water ride vehicle 14 have collapsed.

The control system 30 may generally control the operation of the water effect devices 16 (e.g., activating, deactivating, adjusting a flow rate, adjust a type of flow) based on feedback received from the sensors 32. That is, the processor 34 may transmit a signal (e.g., a control signal) that causes the one or more water effect devices 16 to provide a fluid flow in accordance with a stage of operation selected by the control system 30. The one or more sensors 32 generally include devices that may generate, acquire, and/or receive data (e.g., image data, audio data, electronic data, movement data, and the like), such as imaging devices (e.g., camera, video recording device, and the like), motion sensors (e.g., passive infrared (PIR) sensors, microwave, and the like), accelerometers, proximity sensors, contact sensors, reader devices (e.g., radio-frequency identification (RFID) devices, barcode scanners, QR code scanners, devices capable of communicating via Bluetooth, radio-frequency, local area networks (LANs), wide area networks (WANs), wireless WANs (WWANs), wireless LANs (WLANs), mobile communications networks (e.g., 3G, 4G, Edge, and the like), and the so forth. In some embodiments, the one or more sensors 32 may be placed or positioned in areas of the water ride vehicle 14 based on where a collision is more likely to occur. For example, multiple sensors 32 may be disposed the side facing the interior of the water ride vehicle 14 and/or facing away from the interior of the water ride vehicle 14.

In one embodiment, the signal to control operation of the one or more water effect devices 16 may be based at least in part on a signal from a ride technician that the rider 24 is correctly positioned in the water ride vehicle 14, after a predetermined time period following the start of the water ride 10, and the like. For example, the control system 30 may transmit a first control signal to the one or more water effect devices 16 that causes the one or more water effect devices to provide a first fluid flow (e.g., having a first fluid flow rate and/or first fluid flow type) at a first time. Additionally, the control system 30 may transmit a second control signal to the one or more water effect devices 16 (e.g., or a different set of the one or more water effect devices 16) that causes the one or more water effect devices 16 to provide a second fluid flow (e.g., having a second fluid flow rate and/or second fluid flow type) at a second time.

To illustrate certain aspects of the present disclosure, FIG. 3 is a perspective view of the multi-stage water effect system 12 that includes multiple water ride vehicles 14 that each have one or more water effect devices 16. As shown in the illustrated embodiment in FIG. 3, the multi-stage water effect system 12 includes a first water ride vehicle 14*a*, a second water ride vehicle 14*b*, and a third water ride vehicle 14*c*. The first water ride vehicle 14*a* has a first water effect device 16*a* and a second water effect device 16*b*, the second water ride vehicle 14*b* has a third water effect device 16*c* and a fourth water effect device 16*d*, and the third water ride vehicle 14*c* has a fifth water effect device 16*e* and a sixth water effect device 16*f*. Additionally, the first water ride vehicle 14*a* has a first sensor 32*a* and a second sensor 32*b*, the second water ride vehicle 14*b* has a third sensor 32*c* and a fourth sensor 32*d*, and the third water ride vehicle 14*c* has a fifth sensor 32*e*. The first water ride vehicle 14*a* also has a special effects systems 48 (e.g., a speaker). As discussed herein, the number and relative positioning of the sensors 32, the water effect devices 16, and the special effects systems 48 is meant to be non-limiting. The multi-stage water effect system 12 also includes one or more attraction features 28. The first attraction feature 28*a*, the second attraction feature 28*b*, and the third attraction feature 28*c* include a sixth sensor 32*f*, a seventh sensor 32*g*, and an eighth sensor 32*h*. The depicted embodiment of the multi-stage water effect system 12 also includes a control system 30, which is communicatively coupled to each of the sensors 32 and configured to control operation of the water effect devices 16 as discussed herein.

To illustrate how the operation of the one or more water effect devices 16 associated with a respective water ride vehicle 14 may change in response to a water ride vehicle interaction, FIG. 4 is a perspective view of the multi-stage water effect system 12 shown in FIG. 3. In general, multiple water ride vehicle interactions associated with each water ride vehicle 14 have triggered different stages of operation for each of the water effect devices 16 of the multiple water ride vehicles 14 (e.g., the first water ride vehicle 14*a*, the second water ride vehicle 14*b*, and the third water ride vehicle 14*c*).

As shown in the depicted embodiment, the first water effect device 16*a* and the second water effect device 16*b* are providing a fluid flow 26*a* and a fluid flow 26*b*, respectively. In this case, the first water effect device 16*a* and the second water effect device 16*b* are activated in response to a detected water ride vehicle interaction corresponding to the first water ride vehicle 14*a* colliding with the first attraction feature 28*a* and the attraction feature 28*c*. That is, the first sensor 32*a* disposed on the first water ride vehicle 14*a* is within the first area 50*a* to interact with the sixth sensor 32*f* disposed on the first attraction feature 28*a* and the control system 30 receives a feedback indicative of the interaction (e.g., from the first sensor 32*a* and/or the sixth sensor 320. Additionally, the first sensor 32*a* is within the second area 50*b* to interact with the eighth sensor 32*h* disposed on the third attraction feature 28*c* and the control system 30 receives an additional feedback indicative of the additional interaction (e.g., from the first sensor 32*a* and/or the eighth sensor 32*h*). In one embodiment, the feedback and/or the additional feedback may each include an identification of which sensor(s) 32 interacted, a position of the sensor(s) 32 on the water ride vehicle 14, and/or the identity of the water ride vehicle. In any case, the control system 30 selects a stage operation based on the feedback and the additional feedback and activates the one or more water effect devices 16 in accordance with the selected stage of operation. As shown in the depicted embodiment, the first water effect device 16*a* and the third water effect device 16*c* are activated and providing a first fluid flow 26*a* and a second fluid flow 26, respectively.

In one embodiment, each sensor 32 may correspond with one or more water effect devices 16 such that the water effect device 16 of the one or more water effect devices 16 may correspond to a relative location of the water ride vehicle interaction on the water ride vehicle 14. For example, when the first sensor 32*a* is interacting with the sixth sensor 32*f* and the first sensor 32*a* is not interacting with the eighth sensor 32*h*, then only one of the water effect devices (e.g., the first water effect device 16*a* or third water effect device 16*c*) may be activated. In another embodiment, in response to the sensor(s) 32 detecting one or more water ride vehicle interactions associated with the water ride vehicle 14*a*, the control system 30 may transmit a control signal instructing the special effects device 48 (e.g., a speaker) to output audio, such as a sound of water filling the boat, which may add to the thrill experience by the rider 24*a*.

As shown in the depicted embodiment, the fourth water effect device 16*d* of the second water ride vehicle 14*b* and the fifth water effect device 16*e* of the third water ride vehicle 14*c* are providing a fluid flow 26*c* and a fluid flow 26*d*, respectively. In this case, the fourth water effect device 16*d* and the fifth water effect device 16*e* are activated in response to an additional detected water ride vehicle interaction corresponding to the second water ride vehicle 14*b* colliding with the third water ride vehicle 14*c*. More specifically, the third sensor 32*c* disposed on the second water ride vehicle 14*b* is within the third area 50*c* to interact with the fifth sensor 32*e* disposed on the third water ride vehicle 14*c* and the control system 30 receives a feedback indicative of this interaction (e.g., from the third sensor 32*c* and/or the fifth sensor 32*e*). As mentioned above, the feedback may include an identification of which sensor(s) 32 interacted, a position of the sensor(s) 32 on the water ride vehicle 14, and/or the identity of the water ride vehicle. In any case, the control system 30 may select a stage of operation based on the feedback and activate the one or more water effect devices 16 of the second water ride vehicle and/or the third water ride vehicle 14*c*. As shown in the depicted embodiment, the fourth water effect device 16*d* and the fifth water effect device 16*e* are activated and providing a third fluid flow 26*c* and a fourth fluid flow 26*d*, respectively. While the third water effect device 16*c* of the second water ride vehicle 14*b* and the sixth water effect device 16*f* of the third water ride vehicle 14*c* are not activated in depicted embodiment, in another embodiment, the third water effect device 16*c* and the sixth water effect device 16*f* may be activated as a result of the additional detected water ride vehicle interaction or may be activated when the control system 30 selects another stage of operation for the water ride vehicle(s) 14.

In another embodiment, the control system 30 may be configured to activate one or more water effect devices 16 based on the water ride vehicle 14 moving a certain distance or passing a distance threshold. For example, the water effect device 16*d* of the second water ride vehicle 14*b* and the water effect device 16*e* of the third water ride vehicle 14*c* may activate based on the water ride vehicles 14 moving within a distance of the second attraction feature 28*b*. That is, the seventh sensor 32*g* may be emit radiation having a frequency (e.g., visible, infrared, radio, and the like) that may be detected by the sensor(s) 32 of the water ride vehicle(s) 14 and the detected radiation may be used by the control system 30 for selecting a stage of operation.

In one embodiment, the control system 30 operates to provide a varied experience for each individual water ride vehicle 14 and or water ride 10 over the course of multiple ride cycles of a day. For example, the control system 30 may access the stored executed control instructions of an individual ride vehicle 14 that are indicative of a last ride cycle of the water ride. The control system 30 may then vary the next set of instructions so that the ride experience is different between runs. The variability, and resulting different instructions provided to the water effect devices 16, may be based according to the factors provided herein, such as rider profile information or water event interactions. In an embodiment, the instructions may be randomly set, whereby the timing and duration of activation, the selection of the set of water effect devices 16 that are activated, and/or the flow rate or pressure are all subject to variable control parameters that may be set by a random parameter generator.

FIG. 5 shows a cross-sectional view of a water ride vehicle 14 of the multi-stage water effect system 12 having multiple water effect devices 16. Each water effect device 16 of the multi-stage water effect system 12 includes one or more fluid conduits or fluid circuits 52 that may each be selectively coupled to receive fluid (e.g., water) from the fluid source 44 (e.g., a container, reservoir, collecting chamber) via corresponding valves 54. The water effect devices 16 may include one or more fluid ports 46 that may provide the fluid to the interior 56 of the water ride vehicle 14. Additionally, the water effect devices 16 may also include one or more fluid pumps 58 that may modify (e.g., increase or decrease) the flow rate of the fluid flow provided by the one or more water effect devices 16. The multi-stage water effect system 12 also includes a drain 60 that may be selectively coupled to the fluid source 44 via the drain valve 62 to return the water that fills the interior 56 of the water ride vehicle 14 to the fluid source 44. In this way, the fluid flow provided by the one or more water effect devices 16 may be a closed system, and may facilitate cleaning of the multi-stage water effect system 12.

In certain embodiments, various fluid transfer and ingress/egress features, such as the fluid source 44, the circuits 52, the valves 54, the pumps 58, ducts, and/or the drain may be hidden under functional components (e.g., a seat) of the water ride vehicle 14 as well as thematic components of the water ride vehicle 14, such as a chest, a barrel, the seams 15 or grate 21. In one example, various additional drains or ducts may be incorporated into the bottom of the water ride vehicle 14 to permit fluid drainage so that the personal belongings or clothing of the riders 24 does not become waterlogged. Further, the water ride vehicle 14 may include features that encourage gravity-based drainage via ducts in the stern when the water ride vehicle 14 is docked or when the bow of the water ride vehicle 14 is oriented upward. In other embodiments, the water ride vehicle 14 may be actively pumped out between ride cycles.

During operation, the control system 30 selectively fluidically couples one or more of the circuits 52 (e.g., the first circuit 52*a*, the second circuit 52*b*, and the third circuit 52*c*) to the fluid source 44 via the valves 54 (e.g., the first valve 54*a*, the second valve 54*b*, and the third valve 54*c*) based on water ride vehicle interactions identified by the control system 30. For instance, the control system 30 may receive feedback indicative of the water ride vehicle 14 colliding into another feature of the water ride, determine a stage of operation for the one or more water effect devices 16, and selectively adjust (e.g., open, partially open, partially close, or completely close) a position of the first valve 54*a*, the second valve 54*b*, and the third valve 54*c* based on the feedback. Additionally or alternatively, the control system 30 may adjust a flow rate provided by the first pump 58*a*, the second pump 58*b*, and the third pump 58*c* based on the feedback. For example, the control system 30 may increase (e.g., continuously or iteratively) a flow rate of fluid provided by a water effect devices 16 from a first flow rate to a second flow rate by adjusting the speed of a respective pump 58 as the stage operation of the multi-stage water effect system 12 changes. In certain embodiments, a single valve 54 may couple two or more of the circuits 52, and therefore, the control system 30 may enable the fluid from the fluid source 44 to flow through multiple circuits 52 by adjusting a single valve 54. In any case, when the first circuit 52*a*, the second circuit 52*b*, and the third circuit 52*c* are fluidly coupled to the fluid source 44 via the first valve 54*a*, the second valve 54_b_, and the third valve 54_c_ may provide a fluid flow 26 to at least the interior 56 of the water ride vehicle 14.

FIG. 6 is a flow diagram of a method 70 of operating the multi-stage water effect system 12. As noted, the control system 30 of the multi-stage water effect system 12 may receive a signal indicative of a water ride vehicle interaction (block 72). The signal may be one or a combination of an operator input, a sensor feedback, or after a time duration has been reached (e.g., from the start of the ride, or from the start of a stage). Upon receipt of the signal, the control system 30 selects a stage to operate the multi-stage water effect system 12 (block 74). For example, the control system 30 may determine one or more water ride vehicles 14 associated with the water ride vehicle interaction. The control system may also determine a current stage of operation of the water ride vehicle 14, such as whether the water ride vehicle is currently in the initial stage 18 of operation, the first stage 20 of operation, or the second stage 22 of operation. The control system 30 may also determine a subset of the one or more water effect devices 16 of each of the one or more water ride vehicles 14 to activate based on the signal. Additionally, the control system 30 may determine a flow rate and/or flow type that corresponds to the selected stage of operation to provide to the one or more water ride vehicles 14 using the one or more water effect devices 16. In addition, any accompanying special effects may also be activated concurrently with the fluid flow. The fluid flow may be under volume or time control. That is, in one embodiment, the fluid flow is maintained until a desired fill level within the interior 56 of the water ride vehicle 14 is reached, which may be determined based on operator input and/or sensor feedback. In another embodiment, the fluid flow may continue until expiration of a timer. For example, the timer may be set based on a predetermined volume of the interior 56 of the water ride vehicle 14, an average displacement of the rider 24, the flow rate of the fluid outlet ports 46, and a desired fill level (e.g., a fill level that fills to no higher than calf height for the shortest possible rider). In a specific embodiment, the fill level may be dynamically adjusted based on the anatomy of an individual rider 24. Once the desired stage of operation is determined, the control system 30 may output a control signal to the one or more water effect devices 16 causing the one or more water effect devices 16 to provide a fluid flow based on the stage of operation (block 76).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A multi-stage water effect system, comprising:

a water ride vehicle comprising one or more water effect devices;

a plurality of sensors configured to obtain feedback associated with an interaction between the water ride vehicle and one or more objects, wherein the plurality of sensors is disposed on the one or more objects, on the water ride vehicle, or both;

a control system communicatively coupled to the one or more water effect devices of the water ride vehicle, wherein the control system is configured to:

receive feedback from at least one sensor of the plurality of sensors, the feedback indicating the water ride vehicle is within a threshold range of the one or more water effect devices;

select a stage of operation from a plurality of stages of operation, wherein the plurality of stages of operation comprises a first stage of operation associated with a first flow rate of fluid from the one or more water effect devices and a second stage of operation associated with a second flow rate of the fluid from the one or more water effect devices; and activate the one or more water effect devices of the water ride vehicle to provide a fluid flow based on the selected stage of operation.

2. The multi-stage water effect system of claim 1, wherein the one or more objects comprise one or more additional water ride vehicles.

3. The multi-stage water effect system of claim 1, wherein the one or more water effect devices is a plurality of water effect devices, and wherein activating the the plurality of water effect devices of the water ride vehicle comprises:

activating a first subset of the plurality of water effect devices to provide the fluid flow at the first flow rate based on selection of the first stage; and activating a second subset of the plurality of water effect devices to provide the fluid flow at the second flow rate based on selection of the second stage.

4. The multi-stage water effect system of claim 1, wherein the feedback comprises a force of impact between the water ride vehicle and the one or more objects, and wherein the selecting the stage of operation of the plurality of stages of operation based on the feedback comprises:

determining a magnitude of the force of impact between the water ride vehicle and the one or more objects is within a threshold range; and selecting the stage of operation of the plurality of stages of operation based on the magnitude of the force of impact.

5. The multi-stage water effect system of claim 1, wherein the control system is configured to:

receive an additional feedback associated with the interaction between the water ride vehicle and the one or more objects from at least one sensor of the plurality of sensors; and activate one or more additional water effect devices of the water ride vehicle to provide an additional fluid flow based on the sensor that obtained the feedback.

6. The multi-stage water effect system of claim 1, wherein the control system is configured to:

identify an additional water vehicle that is closer to an object associated with the at least one sensor; and activate one or more additional water effect devices of the additional vehicle based on the additional water vehicle being closer to the object.

7. The multi-stage water effect system of claim 1, wherein the stage of operation is selected based on a relative location of the at least one sensor to a location of the water ride vehicle.

8. The multi-stage water effect system of claim 1, wherein at least one of the plurality of sensors is disposed on a side of the water ride vehicle facing away from an interior of the water ride vehicle.

9. The multi-stage water effect system of claim 1, wherein the plurality of sensors comprises imaging devices, motion sensors, accelerometers, proximity sensors, contact sensors, reader devices, or any combination thereof.

10. A water ride system comprising:

a water ride vehicle comprising a plurality of water effect devices configured to provide a fluid flow within the water ride vehicle;

a plurality of sensors configured to obtain feedback associated with an interaction between the water ride vehicle and a plurality of objects, wherein the plurality of sensors is disposed on one or more objects of the plurality of objects, on the water ride vehicle, or both;

a control system communicatively coupled to the plurality of sensors and the plurality of water effect devices, wherein the control system is configured to:

receive feedback from at least one sensor of the plurality of sensors, wherein the feedback is indicative of a distance between the water ride vehicle and at least one object of the plurality of objects;

select a stage of operation from a plurality of stages of operation based on the distance between the water ride vehicle and the at least one object, wherein the plurality of stages of operation comprises a first stage of operation associated with a first flow rate of fluid from a first subset of the plurality of water effect devices and a second stage of operation associated with a second flow rate of the fluid from a second subset of the plurality of water effect devices;

activate the first subset of the plurality of water effect devices to provide the fluid at the first flow rate in response to selection of the first stage of operation; and activate the second subset of the plurality of water effect devices to provide the fluid at the second flow rate in response to selection of the second stage of operation, wherein the first flow rate is different than the second flow rate.

11. The water ride system of claim 10, wherein the stage of operation is selected based on a relative location of the at least one sensor to a location of the water ride vehicle.

12. The water ride system of claim 10, comprising the plurality of objects, wherein the objects comprise one or more additional water vehicles, physical attraction features, or a combination thereof.

13. The water ride system of claim 10, wherein the second flow rate is greater than the first flow rate, and wherein the second subset of the plurality of water effect devices comprises more water effect devices than the first subset of the plurality of water effect devices.

14. The water ride system of claim 10, wherein selecting the stage of operation from the plurality of stages of operation based on the distance between the water ride vehicle and at least one object of the plurality of object comprises:

selecting the first stage of operation when the feedback is indicative of an initial collision between the water ride vehicle at the at least one object of the plurality of objects; and selecting the second stage of operation when the feedback is indicative of subsequent interaction associated with the water ride vehicle and the plurality of objects, wherein the subsequent interaction occurs after the initial collision.

15. The water ride system of claim 10, wherein the control system is configured to escalate the first stage of operation by increasing a flow rate of the fluid from the first flow rate to the second flow rate, activating additional water effect devices of the water ride vehicle, or both.

16. A method performed by a control system, the method comprising:

receiving feedback from a plurality of sensors, wherein the feedback comprises a force of impact between a water ride vehicle and at least one object of one or more objects, wherein the plurality of sensors is disposed on the one or more objects, on the water ride vehicle, or both;

determining a stage of operation for the water ride vehicle based on the feedback; and activating a plurality of water effect devices to provide a fluid flow via one or more water effect devices of the plurality of water effect devices based on the stage of operation.

17. The method of claim 16, wherein determining the stage of operation comprises:

determining a time duration that the one or more of water effect devices have provided a previous fluid flow prior to the fluid flow; and determining the stage of operation for the water ride vehicle based on the feedback and the time duration.

18. The method of claim 16, wherein activating the plurality of water effect devices comprises determining a relative location of the plurality of sensors and the water ride vehicle.

19. The method of claim 16, wherein the feedback indicates a distance between a first subset of the plurality of sensors disposed on the one or more objects and a second subset of the plurality of sensors disposed on the water ride vehicle.

* * * * *